Aug. 14, 1951     A. M. HENDERHAN     2,564,256
CENTERING POINT FOR LATHES, GRINDING
MACHINES AND THE LIKE
Filed Jan. 20, 1947

Inventor
Alberta M. Henderhan

By *Clarence A. O'Brien and Harvey B. Jacobson*
Attorneys

Patented Aug. 14, 1951

2,564,256

UNITED STATES PATENT OFFICE 2,564,256

CENTERING POINT FOR LATHES, GRINDING MACHINES, AND THE LIKE

Alberta M. Henderhan, Sunland, Calif.

Application January 20, 1947, Serial No. 723,071

2 Claims. (Cl. 82—33)

1

The present invention relates to new and useful improvements in lathe centers for locating and supporting the center of the work in a lathe, grinding machine, or other types of machines where it is necessary to support the work at its true center while grinding or performing other types of operation on the work.

An important object of the invention is to provide a locating center of this character embodying means for locating and supporting the center of the work in the machine and including an anti-friction abutment carried by the center for one end of the work.

A further object of the invention is to provide an attachment of this character of simple construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
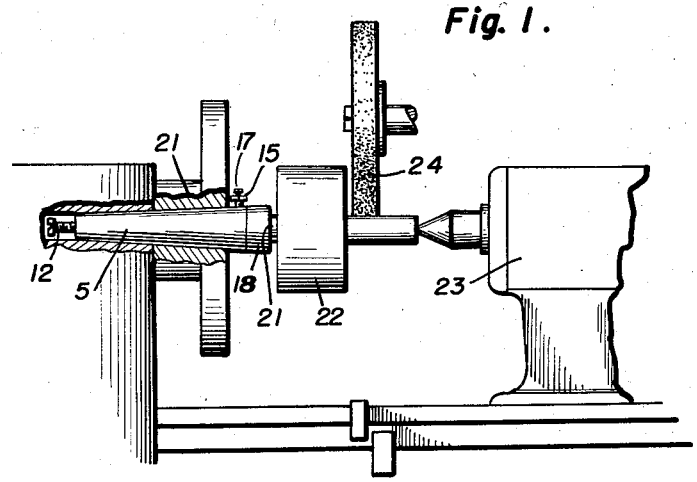
Figure 1 is a side elevational view of a grinding machine showing the locating center mounted therein and with parts broken away and shown in section.

Referring now to the drawing in detail wherein for the purpose of illustration I have disclosed a preferred embodiment of the invention the numeral 5 designates a shank tapering toward its inner end and formed with a longitudinally extending bore 6. A cetering pin 7 is slidably mounted in the front end of the bore, the front end of the pin being tapered as shown at 8 to form a point 9 at its outer end.

A coil spring 10 is positioned in the bore 6 behind the pin, the rear end of the spring abutting a washer 11 slidably mounted in the bore and engaged by an adjusting screw 12 threaded in the rear end of the bore to regulate the tension of the spring 10.

The pin 7 is formed with a longitudinally extending groove 13, the base of the groove having recesses 14 at each end thereof.

A screw 15 is threaded through one side of the shank 5 to position its inner end in the groove 13 to secure the pin 7 against rotary movement. The screw 15 is formed with a threaded bore 16 in which a locking screw 17 is threaded to project inwardly of the screw 15 for entering either the front or rear recess 14 to lock the pin against longitudinal movement in either an inwardly retracted position in the shank 5 or in an outwardly projected position.

Figure 2:
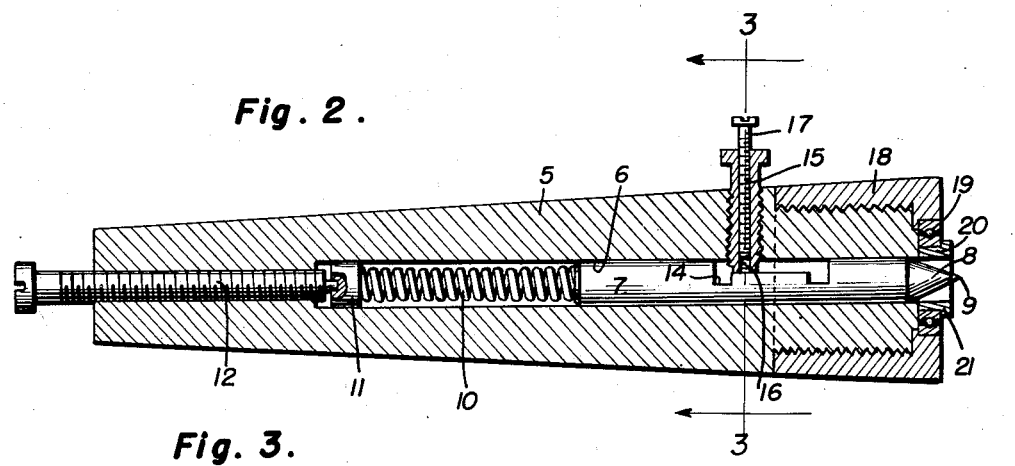
Figure 2 is an enlarged longitudinal sectional view of the locating center.
Figure 3:
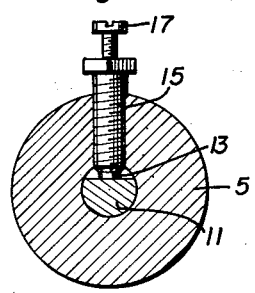
Figure 3 is a transverse sectional view taken on a line 3—3 of Figure 2.
Figure 4:
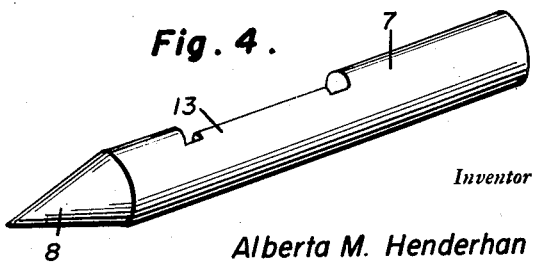
Figure 4 is an enlarged perspective view of the centering pin.

A cap 18 is threaded over the outer end of the shank 5 in the outer end of which a ball bearing assembly 19 is mounted having a sleeve 20 supported centrally thereof and through which the outer end of the pin 7 is movable into and out of its projected position. The outer end of the sleeve 20 is formed with a flange 21 overlying the bearing assembly and projecting forwardly of the front end of the cap 18 and shank 5 as shown more clearly in Figure 2 of the drawing.

In the operation of the device the shank 5 is mounted in the work head 21 of a grinding machine with the front end of the centering attachment projecting outwardly of the work head as shown in Figure 1. The pointed end 9 of pin 7 is projected outwardly by the spring 10 to engage a center recess (not shown) at one side or end of the work 22, the other side or end of the work being supported in the tailstock 23 of the machine. As the work is changed into the machine the pin 7 is retracted in the shank 5 and the work bears against the flange 21 of the sleeve 20 for free rotation of the work after the latter has been properly centered by the pin 7. The work may then be machined or dressed in a desired manner by the grinding wheel 24.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A center locator of the class described comprising a shank having a bore, a spring biased pin slidably mounted in the bore to project from one end thereof, said pin having a longitudinal groove and also having recesses spaced longitudinally from each other, a first locking screw threaded transversely of the shank and engaged in the groove to prevent rotation of the pin, said first locking screw having an internal threaded bore, and a second locking screw in the bore and selectively engageable in the recesses to secure the pin against sliding movement in its projected and retracted positions in the shank.

2. A center locator of the class described comprising a shank having a bore, a spring biased pin slidably mounted in the bore to project from one end thereof, said pin having a longitudinal groove and also having recesses spaced longitudinally from each other, locking means engaging in the groove to prevent rotation of the pin, and locking means engageable in the recesses to secure the pin in a projected or retracted position in the shank, said first and second named locking means comprising a first screw threaded transversely in the shank and a second screw threaded longitudinally through the first screw.

ALBERTA M. HENDERHAN.

REFERENCES CITED

The following references are of record in the file of this patent:

UNITED STATES PATENTS

| Number | Name | Date |
|---|---|---|
| 979,034 | Rowe | Dec. 20, 1910 |
| 1,912,987 | Lovely | June 6, 1933 |
| 2,314,622 | Klamp | Mar. 23, 1943 |
| 2,463,385 | Holohan | Mar. 1, 1949 |

FOREIGN PATENTS

| Number | Country | Date |
|---|---|---|
| 558,312 | France | Aug. 25, 1923 |